(No Model.)
S. W. JOHNSON.
VALVE FOR GAS OR AIR COMPRESSORS.
No. 543,446. Patented July 23, 1895.
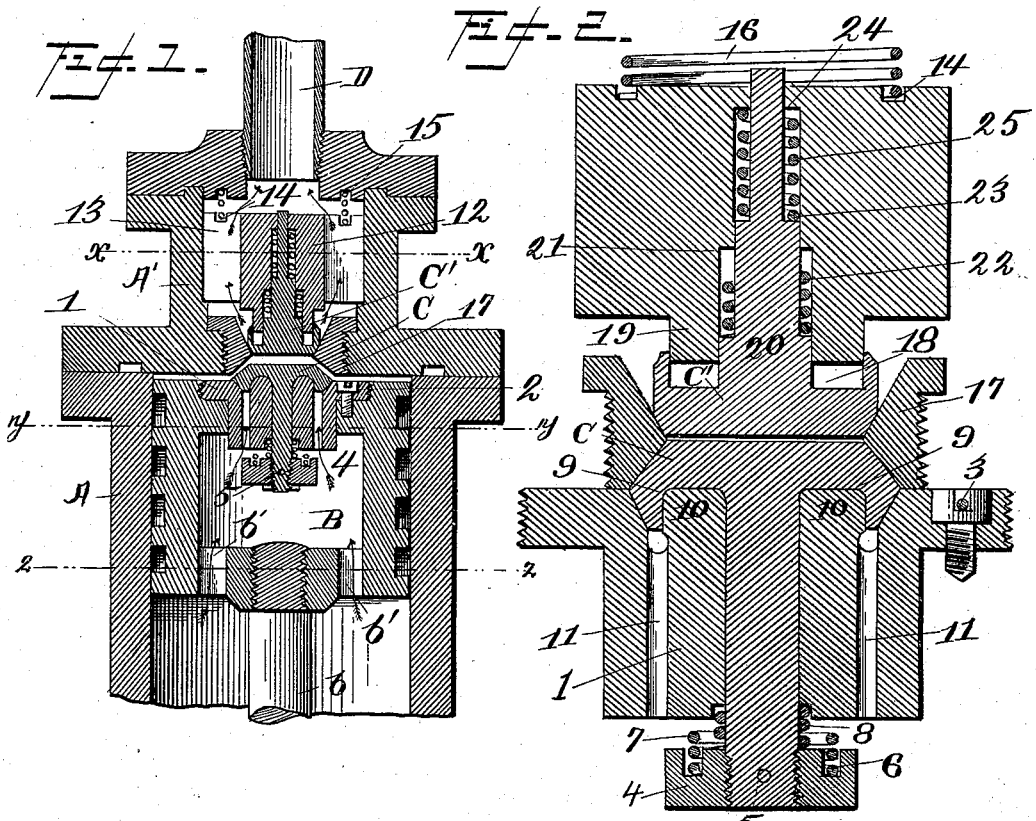
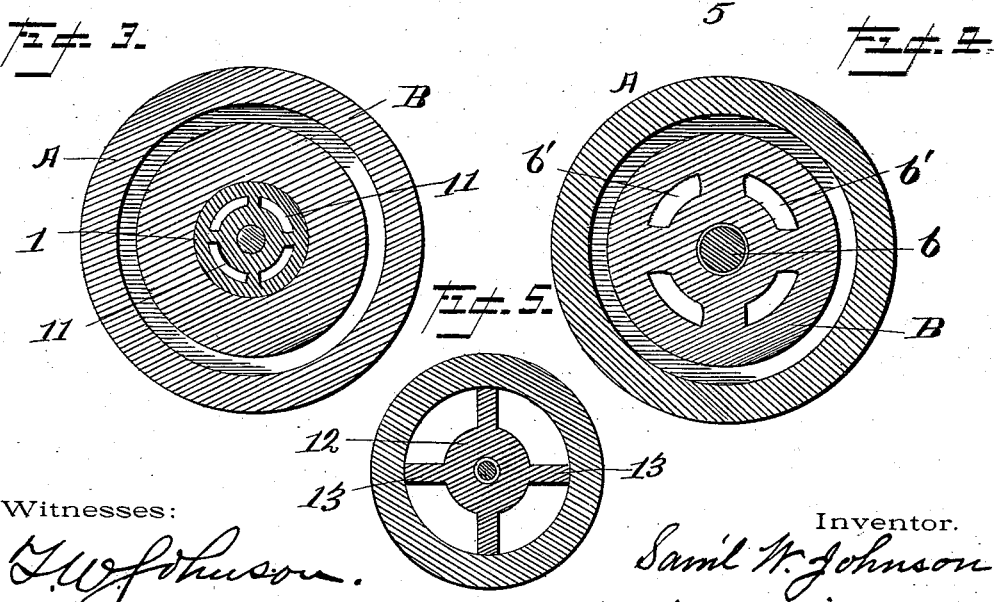
Witnesses:
Inventor.
Sam'l W. Johnson
By J. R. Nottingham
Attorney.

UNITED STATES PATENT OFFICE.

SAMUEL W. JOHNSON, OF NEWPORT NEWS, VIRGINIA.

VALVE FOR GAS OR AIR COMPRESSORS.

SPECIFICATION forming part of Letters Patent No. 543,446, dated July 23, 1895.

Application filed January 13, 1894. Serial No. 496,789. (No model.)

*To all whom it may concern:*

Be it known that I, SAMUEL W. JOHNSON, a citizen of the United States, residing at Newport News, in the county of Warwick and State of Virginia, have invented certain new and useful Improvements in Valves for Gas or Air Compressors; and I do hereby declare the following to be a full, clear, and exact description of the invention, such as will enable others skilled in the art to which it appertains to make and use the same.

This invention relates to certain improvements in the discharge and suction valves for gas or air compressors; and it consists in the novel construction and arrangement of the various parts, as will be hereinafter more fully described, and specifically pointed out in the claims.

The principal objects of the invention are, first, to provide valves of the class above mentioned, in which liability to breakage and consequent damage to the compressor shall be reduced to a minimum; second, to increase the guiding-surfaces which hold the valves in a central position; third, to prevent the rapid wearing of the valves, and, fourth, to lessen the pounding and thumping noise so common to valves now in use. These objects are attained by the mechanism illustrated in the accompanying drawings, in which—

Figure 1 represents a vertical section of the upper part of the cylinder and piston of an air or gas compressor provided with my improved valves and valve-guides. Fig. 2 is a vertical section of the valves and valve-guides enlarged. Figs. 3, 4, and 5 are transverse sectional views taken on lines $xx$, $yy$, and $zz$, respectively, of Fig. 1.

Referring to the drawings, the letters A A' indicate, respectively, the cylinder and cylinder-head, and B the piston, of a gas or air compressor. These parts may be of the ordinary or any approved construction, the piston being provided with the usual rod $b$ and gas or air inlet ports $b'$.

The letters C C' indicate, respectively, the suction and discharge valves. The suction-valve is T-shaped and operates in a flanged guide 1, the flange of which is screwed into the upper end of the piston and securely held in place by a screw 2, said screw being prevented from turning by a pin 3. The stem of the suction-valve is screw-threaded and provided with a screw-threaded nut 4, which is held against displacement by a pin 5, said nut being provided on its inner face with an annular groove 6, in which is seated a stiff coil-spring 7, the purpose of which will be hereinafter explained. A similar spring 8, but of lighter construction, surrounds the valve-stem between the nut 4 and the end of the guide 1 and serves to close the valve. The inner or under face of the valve-head is provided with an annular recess 9 surrounding the valve-stem, into which recess is received the top edge of a projection 10 of the valve-guide 1. By this peculiar construction of the valve-guide and valve-head the valve is accurately guided in its working. The valve-guide is provided with ports 11. (Better shown in Fig. 3.)

The discharge-valve C', which is also T-shaped, operates in a guide 2, having wings 13, which serve to maintain said guide in proper place within the cylinder-head. The outer end of the guide and the cylinder-head cap are provided with an annular groove 14 and 15, respectively, and a coil-spring 16 seated in said grooves serves to hold said guide down.

The discharge-valve is seated in a steel seat 17, which is screwed into the inner flange of the cylinder-head, as shown in Fig. 1, and the inner or under face of its head is provided with an annular recess 18, surrounding the stem, to receive an annular projection 19 of the guide 12, which projection working in said recess serves to accurately guide the valve in its operations. The inner portion of the valve-stem is recessed to form an annular shoulder 20, and the bore of the valve-guide at its inner end is recessed to form an annular shoulder 21, between which shoulders surrounding the said stem is a stiff coil-spring 22, just long enough to permit it to act only when the valve is raised to nearly its full height. The outer portion of the stem is also recessed to form a shoulder 23, and the bore of the valve-guide is recessed to form shoulder 24, and a light coil-spring 25, surrounds the stem between said shoulders and serves to exert a constant pressure on the valve.

The letter D indicates the discharge-pipe, through which the compressed gas or air escapes.

The operation of the suction-valve is as follows: When the piston commences the downward stroke the gas or air enters the piston through the ports $b'$ and, passing through ports 11 of the valve-guide, strikes against the edge of the suction-valve, overcomes the weight of said valve and the force exerted by the light spring 8, and raises said valve from its seat until it is checked by the stiff spring 7 coming in contact with the lower end of the valve-guide 4, thus preventing the sudden shock which would otherwise occur if it were not for the interposed spring. Without the spring the stem soon breaks off just above the nut, and the valve being thus freed of its retaining means will get on top of the piston and the cylinder-head is soon destroyed.

The operation of the discharge-valve will be readily understood, and its action is similar to that of the suction-valve, and the special advantages derived from the novel construction and arrangement of the various parts that accrue to one apply to the other.

It is very necessary to the economical working of a gas or air compressor that the gas or air should pass by the suction-valve with the least possible pressure. Consequently the spring 8, which causes the valve to close quickly when it is at the bottom of the stroke, is made very light and of a length that will not permit it to exert any pressure when the valve is closed, while the spring 7 is just long enough to allow the valve to open sufficiently before it begins to act.

The annular projections of the respective valve-guides, fitting and working snugly within the recess made in the inner or under faces of the respective valve-heads, serve to tighten the valves and lengthen the guiding-surface of the valve-stems, and at the same time provide a second guiding-surface on the outside of each recess. Another advantage of this novel construction is that in opening the valve the gas or air can only strike directly on a part of the under surface of the valve, and consequently it is not opened with as much force as it otherwise would be, thus reducing the wear and noise caused by the opening and closing of the valve.

The valve-guide 1, having on its upper end the valve-seat, and projection 10 being separated from the piston, is easily fitted up and when broken readily replaced.

Having thus fully described my invention, what I claim as new, and desire to secure by Letters Patent is—

1. In a gas or air compressor, the combination with the tubular valve guide, of the suction valve having a stem working in said guide, and an annularly recessed head adapted to fit over and work upon the upper end of said guide, substantially as and for the purpose specified.

2. In a gas or air compressor, the combination with the suction valve, of the tubular valve guide, provided with vertical ports, the said valve having a stem working in said valve guide, and having a head recessed on its under side so as to fit over and work upon the upper end of the valve guide, substantially as specified.

3. In a gas or air compressor, the combination, with the suction valve, its tubular valve guide and recessed head fitting thereon, of the nut at its lower end, the intervening springs, the discharge valve and its head recessed on the upper side and the springs arranged around the stem of the valve, the whole adapted to operate, substantially as specified.

In testimony whereof I affix my signature in the presence of two witnesses.

SAMUEL W. JOHNSON.

Witnesses:
CLARA L. JOHNSON,
ELLEN A. JOHNSON.